(12) United States Patent
Sudarshanam (10) Patent No.: US 8,009,945 B2
(45) Date of Patent: Aug. 30, 2011

(54) BEAM AREA ADJUSTMENT THROUGH FIBER BENDING

(75) Inventor: Venkatapuram S. Sudarshanam, Chesterbrook, PA (US)

(73) Assignee: AMS Research Corporation, Minnetonka, MN (US)

( * ) Notice: Subject to any disclaimer, the term of this patent is extended or adjusted under 35 U.S.C. 154(b) by 0 days.

(21) Appl. No.: 12/644,654

(22) Filed: Dec. 22, 2009

(65) Prior Publication Data

US 2010/0158458 A1 Jun. 24, 2010

Related U.S. Application Data

(60) Provisional application No. 61/139,902, filed on Dec. 22, 2008.

(51) Int. Cl.
*G02B 6/26* (2006.01)
(52) U.S. Cl. .............................. 385/32; 385/38; 385/134
(58) Field of Classification Search .................... 385/32, 385/38, 134
See application file for complete search history.

(56) References Cited

U.S. PATENT DOCUMENTS

| 4,253,727 | A  | * | 3/1981 | Jeunhomme et al. | ........... 385/37 |
| 7,189,961 | B2 | * | 3/2007 | Johnston et al. | ............... 250/234 |
| 2009/0048588 | A1 | | 2/2009 | Peng et al. | |

FOREIGN PATENT DOCUMENTS

WO 2008/073264 A2 6/2008

OTHER PUBLICATIONS

Mode Scrambler 2008/2009, Newport Resource Catalog, Jan. 2008, p. 407.

* cited by examiner

*Primary Examiner* — Jerry T Rahll
(74) *Attorney, Agent, or Firm* — Kimberly K. Baxter; Gregory L. Koeller (57) ABSTRACT

A method positions a first end of an optic fiber a distance from a target and applies a laser light to a second end of the optic fiber such that the laser light is guided by the optic fiber from the second end to the first end of the optic fiber and is emitted from the first end of the optic fiber toward the target as a beam of light. The beam of light has a first area of incidence at the target. The optic fiber is then bent such that the beam of light continues to reach the target and such that the area of incidence of the beam of light at the target changes without changing the distance between the first end of the optic fiber and the target. A device having two plates with raised portions inside a metal case is provided for bending the optic fiber.

11 Claims, 10 Drawing Sheets

BEAM AREA ADJUSTMENT THROUGH FIBER BENDING

REFERENCE TO RELATED CASES

This application claims priority from U.S. Provisional Application 61/139,902, filed on Dec. 22, 2008 and titled "Slip-Clip Fiber Bender for Enhanced Coagulation."

BACKGROUND

Optic fibers guide laser light from a first end of the optic fiber to a second end of the optic fiber. The light is maintained within the optic fiber due to total internal reflection that occurs at a boundary between a central core of the optic fiber and a surrounding cladding. This total internal reflection is caused by a difference in the index of refraction of the core relative to the cladding.

In some optic fibers, the laser light is emitted from the end of the optic fiber. In other optic fibers, the end of the optic fiber is altered so that light guided within the optic fiber is emitted from a side surface of the optic fiber. Typically, this alteration involves removing the cladding around the core at the end of the optic fiber and forming a total internal reflection surface on the end of the core. The total internal reflection surface is at an oblique angle to the axis of the optic fiber such that light from the optic fiber is reflected off the surface and out the side of the core. Such optic fibers are known as side-firing optic fibers.

The beam of laser light emitted by optic fibers of the prior art has a fixed diameter at a given distance from the optic fiber tip. This diameter is determined by the geometry and optics of the optic fiber.

The discussion above is merely provided for general background information and is not intended to be used as an aid in determining the scope of the claimed subject matter.

SUMMARY

A method positions a first end of an optic fiber a distance from a target applies a laser light to a second end of the optic fiber such that the laser light is guided by the optic fiber from the second end to the first end of the optic fiber and is emitted from the first end of the optic fiber toward the target as a beam of light. The beam of light has a first area of incidence at the target. The optic fiber is then bent such that the beam of light continues to reach the target and such that the area of incidence of the beam of light at the target changes without changing the distance between the first end of the optic fiber and the target.

A device comprises a first plate having at least two raised portions and a second plate having at least two raised portions. A spring means is biased to pull the plates apart. A metal case encloses the first plate and the second plate and defines a first opening on a first end of the metal case and a second opening on a second end of the metal case wherein the first opening and the second opening are sized to accept an optic fiber.

A method comprises placing a portion of an optic fiber in an optic fiber bending device and closing a case of the optic fiber bending device such that the case completely shields from view the portion of the optic fiber that is within the optic fiber bending device. Pressure is applied to a first plate and a second plate in the fiber bending device to cause the first plate and the second plate to move toward each other and thereby bend the optic fiber.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
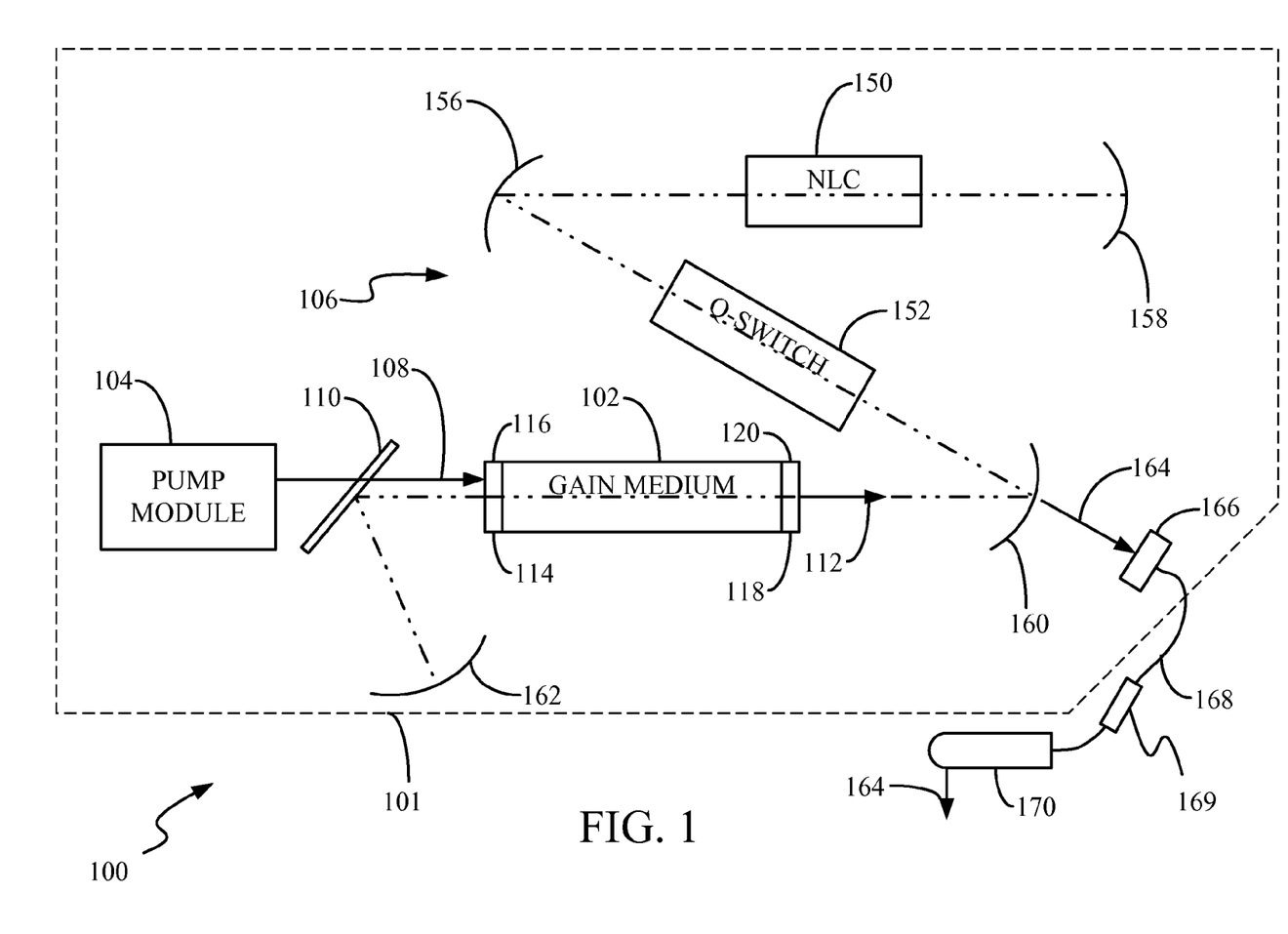
FIG. 1 is a block diagram of a laser system.

FIG. 1 is a schematic illustration of a laser system 100 in accordance with some embodiments. The laser system 100 includes a laser production systems 101, an optic fiber 168, and a side-firing delivery tip 170. Laser production system 101 includes a gain medium 102, a pump module 104 and a laser resonator 106. In one embodiment, the gain medium 102 is a doped crystalline host that is configured to absorb pump energy 108 generated by the pump module 104 having a wavelength that is within an operating wavelength (i.e., absorption spectra) range of the gain medium 102. In one embodiment, the gain medium 102 is end-pumped by the pump energy 108, which is transmitted through a folding mirror 110 that is transmissive at the wavelength of the pump energy 108. The gain medium 102 absorbs the pump energy 108 and responsively outputs laser light 112.

In some embodiments, the gain medium 102 is water cooled (not shown) along the sides of the host (not shown).

In one embodiment, the gain medium 102 includes an undoped end cap 114 bonded on a first end 116 of the gain medium 102, and an undoped end cap 118 bonded on a second end 120 of the gain medium 102. In one embodiment, the end 120 is coated so that it is reflective at the pump energy wavelength, while transmissive at a resonant mode of the system 100. In this manner, the pump energy that is unabsorbed at the second end 120 is redirected back through the gain medium 102 to be absorbed.

The laser resonator 106 is configured to generate a harmonic of the laser light 112 output from the gain medium 102. In one embodiment, the laser resonator 106 includes a non-linear crystal (NLC) 150, such as a lithium borate (LBO)

crystal or a potassium titanyl phosphate crystal (KTP), for generating a second harmonic of the laser beam 112 emitted by the gain medium 102.

In one embodiment, the gain medium 102 comprises a yttrium-aluminum-garnet crystal (YAG) rod with neodymium atoms dispersed in the YAG rod to form a Nd:YAG gain medium 102. The Nd:YAG gain medium 102 converts the pump light into the laser light 112 having a primary wavelength of 1064 nm. The laser resonator 106 generates the second harmonic of the 1064 nm laser light 164 having a wavelength of 532 nm. One advantage of the 532 nm wavelength is that it is strongly absorbed by hemoglobin in blood and, therefore, is useful in medical procedures to cut, vaporize and coagulate vascular tissue.

In one embodiment, the laser resonator 106 includes a Q-switch 152 that operates to change the laser beam 112 into a train of short pulses with high peak power to increase the conversion efficiency of the second harmonic laser beam.

The laser resonator 106 also includes reflecting mirrors 156, 158 and 162, folding mirror 110, and output coupler 160. The mirrors 110, 156, 158 and 162, and output coupler 160 are highly reflective at the primary wavelength (e.g., 1064 nm). The output coupler 160 is highly transmissive at the second harmonic output wavelength (e.g., 532 nm). The primary wavelength laser beam (e.g., 1064 nm) inside the resonator 106 bounces back and forth along the path between the mirrors 158 and 162, passing through the gain medium 102 and the non-linear crystal 150 to be frequency doubled to the second harmonic output wavelength (e.g., 532 nm) beam, which is discharged through output coupler 160 as the output laser 164. The Z-shaped resonant cavity can be configured as discussed in U.S. Pat. No. 5,025,446 by Kuizenga.

An optical coupler 166 receives output laser 164 and introduces laser 164 into optical fiber 168. The optic fiber 168 generally comprises multiple concentric layers that include an outer nylon jacket, a buffer or hard cladding, a cladding and a core. The cladding is bonded to the core and the cladding and core operate as a waveguide that allows electromagnetic energy, such as laser beam 164, to travel through the core.

Laser beam 164 is guided along optic fiber 168 through optic fiber bending device 169 to side-firing delivery tip 170, which emits the laser beam at an angle to the axis of optic fiber 168. Optic fiber bending device 169 is a hand-held device that can be changed from a state in which optic fiber 168 is not bent to a state in which optic fiber 168 is bent and back again using only a single hand. For embodiments used in medical procedures, this allows medical personnel to bend the optic fiber using one hand while positioning the optic fiber relative to a target using the other hand. When optic fiber 168 is bent by bending device 169, laser beam 164 spreads out such that the area of incidence of the laser beam on a target is larger when optic fiber 168 is bent by bending device 169 than when optic fiber 168 is not bent by bending device 169.

Figure 2:
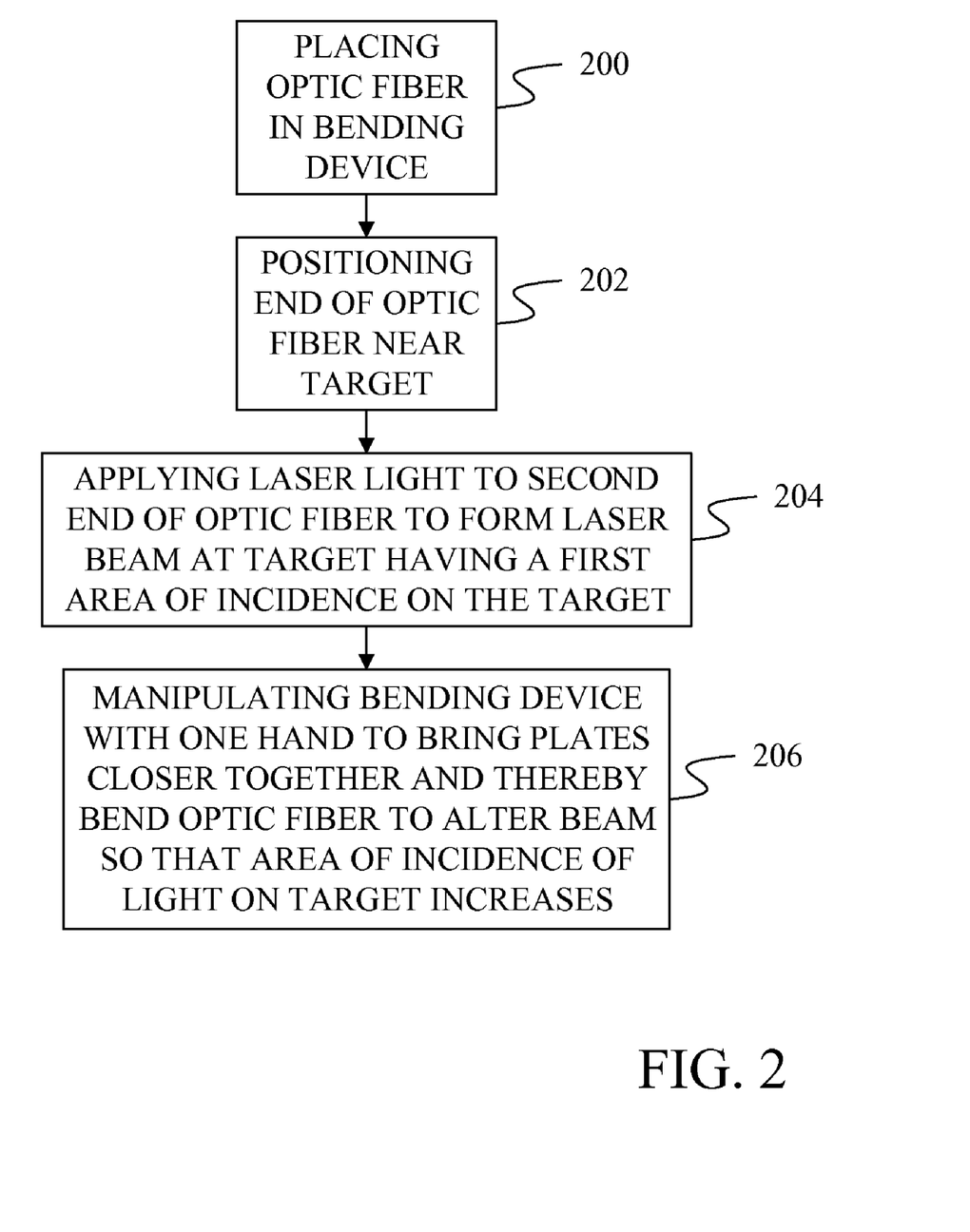
FIG. 2 is a flow diagram of a method of altering an area of incidence of laser light.

FIG. 2 is a flow diagram of a method for altering the area of incidence of a laser beam on a target. In step 200 of FIG. 2, an optic fiber is placed within a bending device. In step 202, a first end of the optic fiber is positioned near a target. At step 204, a laser light is applied to a second end of the optic fiber causing the laser light to be guided by the optic fiber to the first end of the optic fiber where it is emitted toward the target. The emitted laser light strikes the target across an area of incidence on the target. At step 206, the bending device is manipulated with one hand to bring plates within the bending device closer together and thereby bend the optic fiber. This alters the emitted laser beam such that the area of incidence of the laser beam on the target increases without changing the distance between the tip of the optic fiber and the target.

Figure 3:
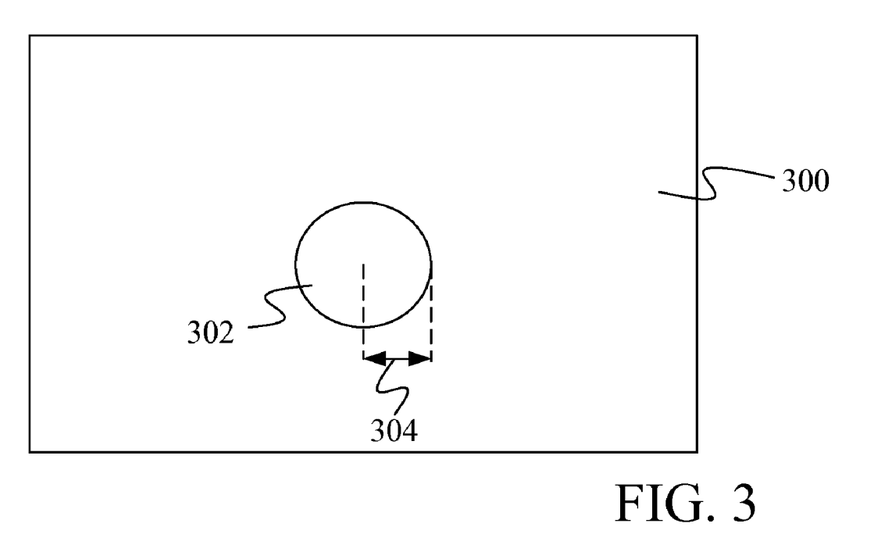
FIG. 3 is a top view of a target with an incident light beam without optic fiber bending.
Figure 4:
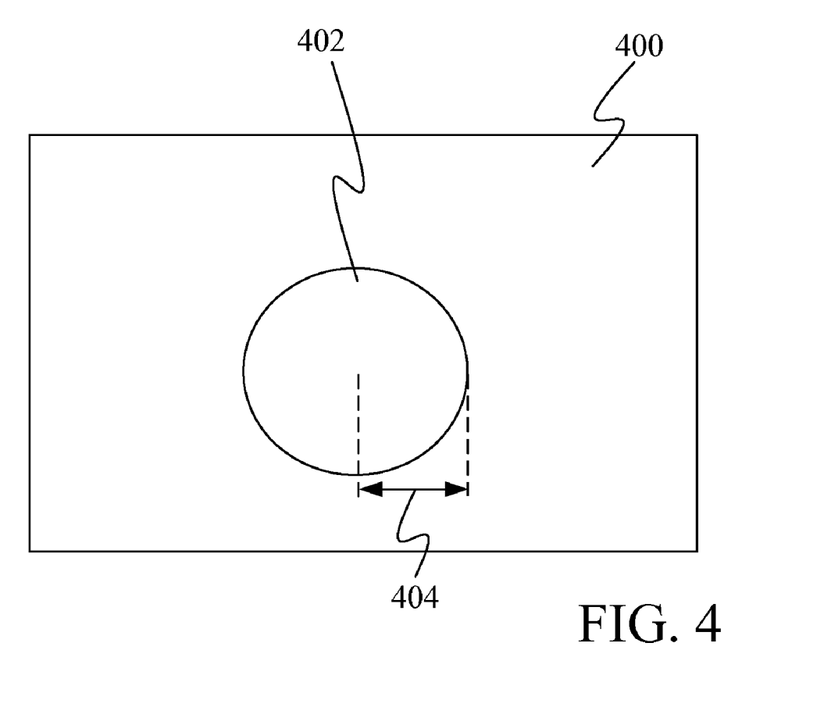
FIG. 4 is a top view of the target of FIG. 3 with an incident light beam with optic fiber bending.

FIG. 3 shows a target 300 with an area of incidence 302 of a laser beam that is formed while an optic fiber is not bent by a bending device of the present invention. In FIG. 3, the area of incidence is shown to be a circle with a radius 304, however other shapes are possible given the optics of the optic fiber tip, the contours of the target, and scattering effects. FIG. 4 shows a target 400 with an area of incidence 402 of a laser beam that is formed when an optic fiber is bent by a bending device of the present embodiment. In FIG. 4, the area of incidence is shown to be a circle with a radius 404, however other shapes are possible given the optics of the optic fiber tip, the contours of the target, and scattering effects. Radius 404 is larger than radius 304 and as such, area of incidence 402 is larger than area of incidence 302. Note that the differences in areas of incidence 402 and 302 are only due to the bending of the optic fiber. The same target, the same distance from target to optic fiber tip, and the same optic fiber and optic fiber tip are used in both FIGS. 3 and 4. The only difference between FIGS. 3 and 4 is that in FIG. 3, the optic fiber is not bent and in FIG. 4 the optic fiber is bent.

Figure 5:
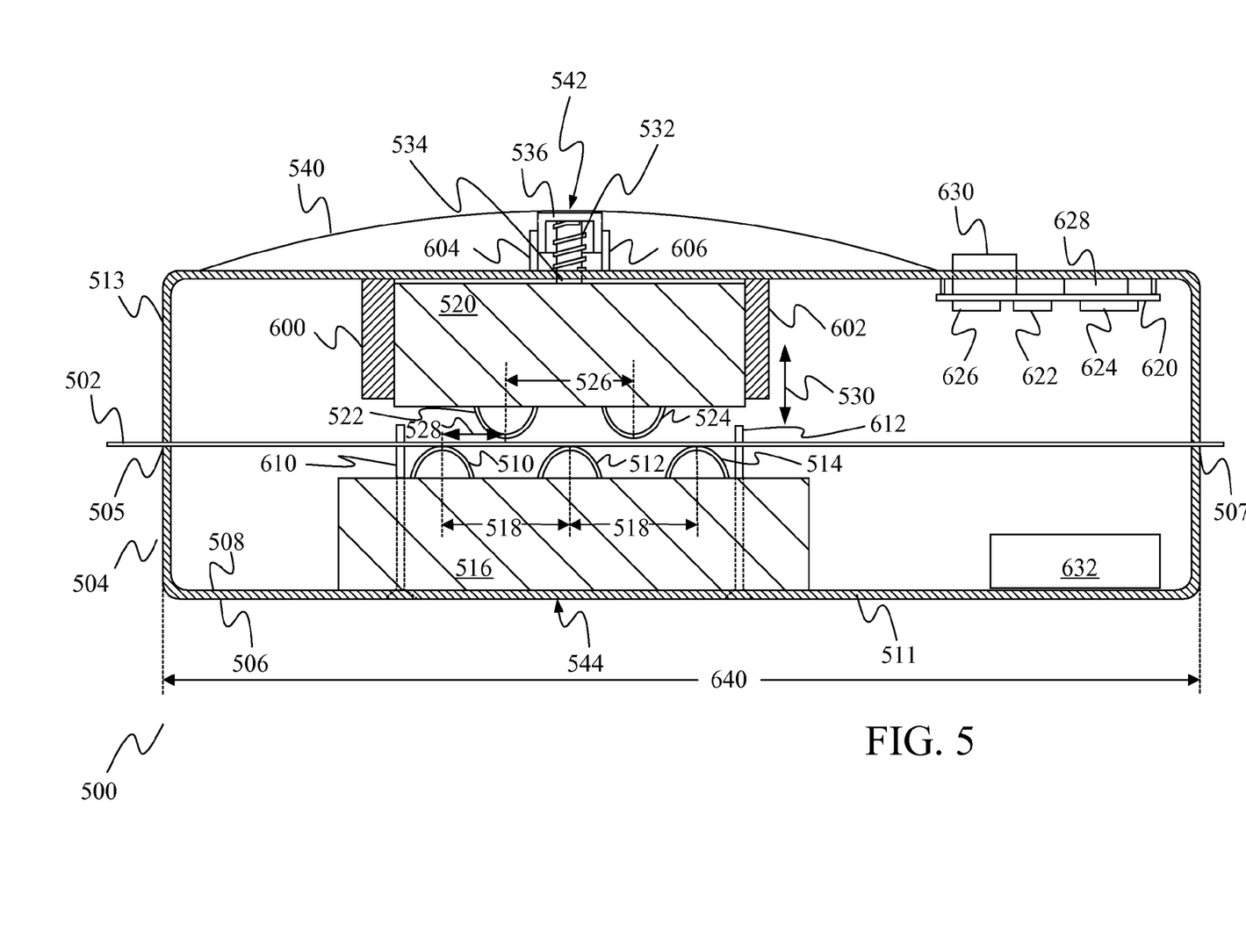
FIG. 5 is a cross-sectional side view of an optic fiber bending device under one embodiment.

FIG. 5 provides a cross-sectional side view of an optic fiber bending device 500 under one embodiment. Optic fiber bending device 500 includes an outer case 504, which under one embodiment as an outer plastic shell 506 and an inner metal layer 508. An optic fiber 502 extends through openings 505 and 507 in case 504, which are sized to fit optic fiber 502, and rests upon three raised portions 510, 512, and 514 of a fixed plate 516. Raised portions 510, 512, and 514 under one embodiment are hollow half-cylinders having a radius of curvature of 0.25 inches with the tops of each cylinder separated horizontally by a distance 518 of 1 inch. Under one embodiment, raised portions 512, 514, and 516 are vertically aligned to ensure uniform contact with optic fiber 502. Fixed plate 516 is mounted on metal layer 508 of a bottom portion 511 of case 504. A moveable plate 520 having raised portions 522 and 524 extends from a top portion 513 of case 504 and is positioned opposite fixed plate 516 such that raised portions 522 and 524 are aligned with the spaces between raised portions 510, 512, and 514 of fixed plate 516. Under one embodiment, raised portions 522 and 524 are hollow half-cylinders with a radius of curvature of 0.25 inches and the tops of the half-cylinders are separated horizontally by a distance 526, which under one embodiment is 1 inch. Under one embodiment, raised portions 522 and 524 are vertically aligned. The top of raised portion 522 is separated from the top of raised portion 510 by a horizontal distance 528, which under one embodiment is 0.5 inches.

Moveable plate 520 can move in a vertical direction 530 toward and away from fixed plate 516. Moveable plate 520 is driven away from fixed plate 516 by a spring 532 mounted on a post 534 that is connected to moveable plate 520 and that passes through case 504. Spring 532 engages the top of case 504 and the bottom of the post cap 536 that is attached to the top of post 534. A flexible cover 540 covers post cap 536. By squeezing a contact point 542 on the top of cover 540 relative to a bottom 544 of case 504, a user is able to move plate 520 toward fixed plate 516.

Figure 6:
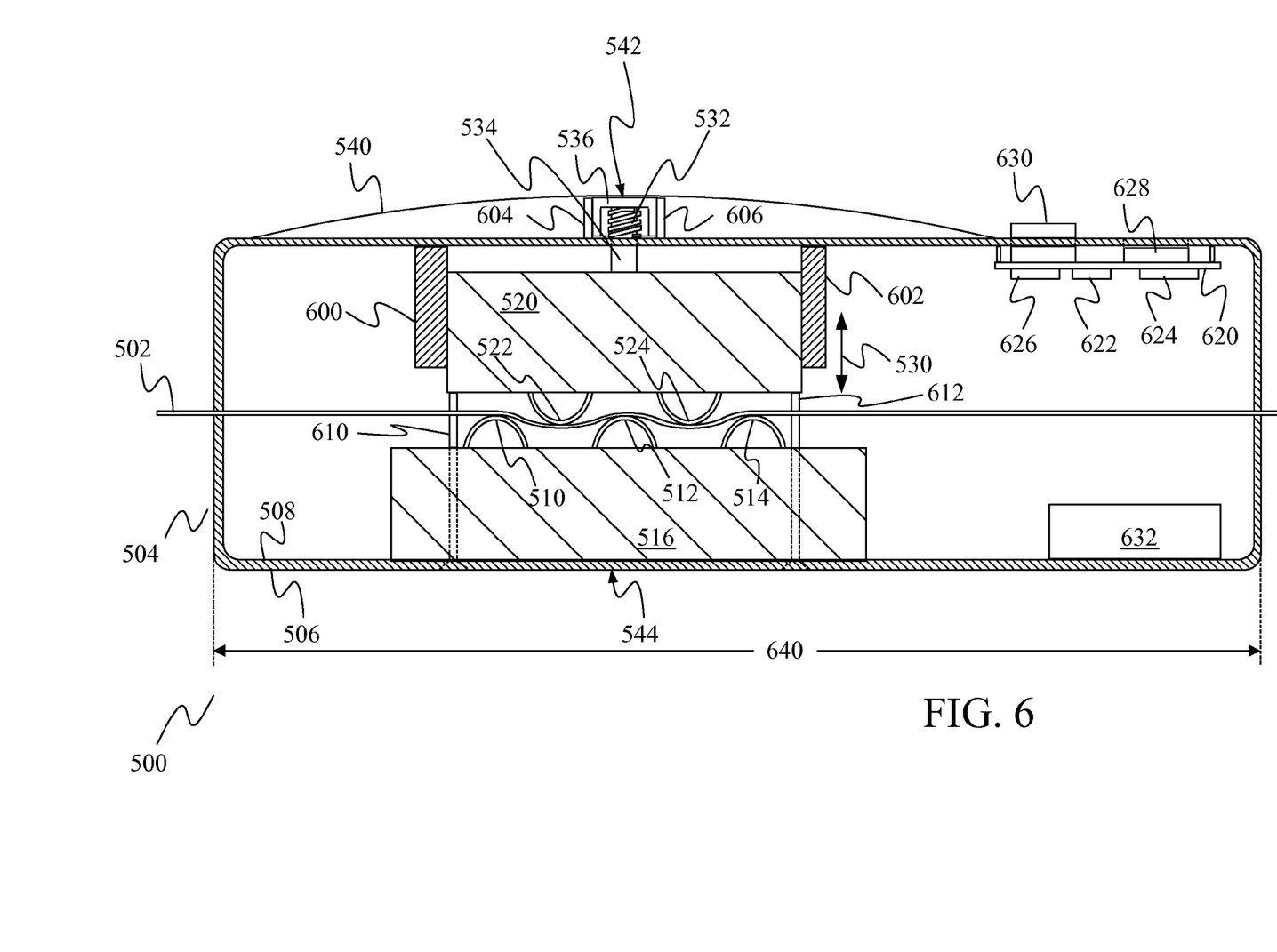
FIG. 6 is a cross-sectional side view of the optic fiber bending device of FIG. 5 showing an optic fiber being bent.

The results of such movement are shown in FIG. 6 where optic fiber bending device 500 is shown in a state in which optic fiber 502 has been bent by the movement of movable plate 520 toward fixed plate 516. In particular, optic fiber 502 includes multiple bends created by movement of raised portion 522 between raised portions 510 and 512 and the movement of raised portion 524 between raised portions 512 and 514. By comparing FIGS. 5 and 6, it can be seen that spring 532 is compressed in FIG. 6 relative to FIG. 5 and therefore provides a force that tends to lift movable plate 520 away from fixed plate 516.

The vertical movement of moveable plate 520 is controlled in part by guides 600 and 602. In addition, the vertical movement of post cap 536 is assisted by guides 604 and 606. Under one embodiment, a locking mechanism is formed form portions of cap 536 and one of guides 604 and 606 that allows optic fiber bending device 500 to be locked into the bending state shown in FIG. 6. A release button, not shown, can be provided in the locking mechanism so that optic fiber bending device 500 may be released from the bending state shown in FIG. 6.

Movement of moveable plate 520 is restrained by restraining or stopping elements 610 and 612, which prevent moveable plate 520 from moving closer to fixed plate 516 than a set distance. Under one embodiment, restraining elements 610 and 612 are screws that screw into fixed plate 516 and extend out of the top of fixed plate 516 so as to engage moveable plate 520 as it moves down toward fixed plate 516. Using such screws, it is possible to adjust the minimum distance between moveable plate 520 and fixed plate 516, and thereby adjust the maximum amount of bending that can be applied to optic fiber 502. If the optic fiber is bent too much, the optic fiber will break, allowing laser light to escape the optic fiber. As such, the restraining elements assist in preventing the optic fiber from breaking during bending.

Optic fiber bending device 500 includes a printed circuit board 620 having a light sensor 622, a speaker controller 624, and light emitting diode controller 626. In addition, printed circuit board 620 contains a speaker 628 that extends through case 504 and a light emitting diode assembly 630 that also extends through case 504. The circuits on printed circuit board 620 are powered by a battery 632 that in one embodiment is mounted in lower portion 511 of optic fiber bending device 500.

Light emitting diode controller 626 receives a signal from a contact sensor mounted on restraining element 612 that indicates contact between restraining element 612 and top plate 520. Upon receiving the sensor signal, light emitting diode controller 626 changes the state of light emitting diode assembly 630 by changing the color of light emitted by light emitting diode assembly 630, causing light emitting diode assembly 632 to produce light, or causing light emitting diode 630 to stop producing light. Although a light emitting diode assembly has been described, other types of lights may be used.

Light sensor 622 detects laser light in case 504. During normal operation, the laser light guided by optic fiber 502 will remain within optic fiber 502 and therefore will not be emitted into case 504. However, if optic fiber 502 breaks, laser light will be emitted into case 504 and will be detected by light sensor 622. If such light is detected by light sensor 622, light sensor 622 will provide a signal to speaker driver 624, which will cause speaker 628 to emit a sound that alerts the user to the breakage of optic fiber 502 in case 504. Such an alert is necessary since breakage of the optic fiber can damage the laser system and can harm the operator either by heating the case or by emitting laser light when the case is opened. As an alternative or an addition to the light sensor, a thermal sensor may be provided that can sense the temperature of the case and that can trigger the speaker driver to generate a sound to indicate fiber breakage if the temperature in the case exceeds a threshold indicating breakage of the optic fiber.

In other embodiment, back reflection from a broken fiber can be detected inside the resonator of the laser system by a pick-off from the beam splitter and an existing safety shutter can be used to cut off the laser light. In still further embodiments, a conductor connects light sensor 622 to the laser production system such that when the light sensor 622 detects laser light, the laser production system shuts off the laser output. In other embodiments, a metal-coated optic fiber may be used such that when the metal coating breaks, the laser production system shuts off the laser output.

Although visible in the cross-sections of FIGS. 5 and 6, the portions of optic fiber 502 that are within case 504 cannot be seen outside of case 504 when case 504 is closed. Thus, case 504 shields from view the portion of the optic fiber that is within the optic fiber bending device. This provides a measure of safety in case the optic fiber breaks while being bent because it contains the laser light within case 504.

In most embodiments, fixed plate 516, moveable plate 520 and raised portions 510, 512, 514, 522 and 524 are constructed of metal. To avoid breakage of the optic fiber, the raised portions on the metal plates should have a smooth finish and should not dig into the coating or sheath of the optic fiber. In addition, sharp edges should not be present within the optic fiber bending device.

Under preferred embodiments, optic fiber bending device 500 has a length 640 that is less than 6 inches. It should also have a height and width that allow it to be held comfortably in one hand. Under one embodiment, the height and width allow optic fiber bending device to be placed with an circle having a radius of 1.5 inches. In some embodiments, case 504 has depressed regions to enable proper support of the fingers and the palm of the user even when gloves are worn by the user.

Figure 7:
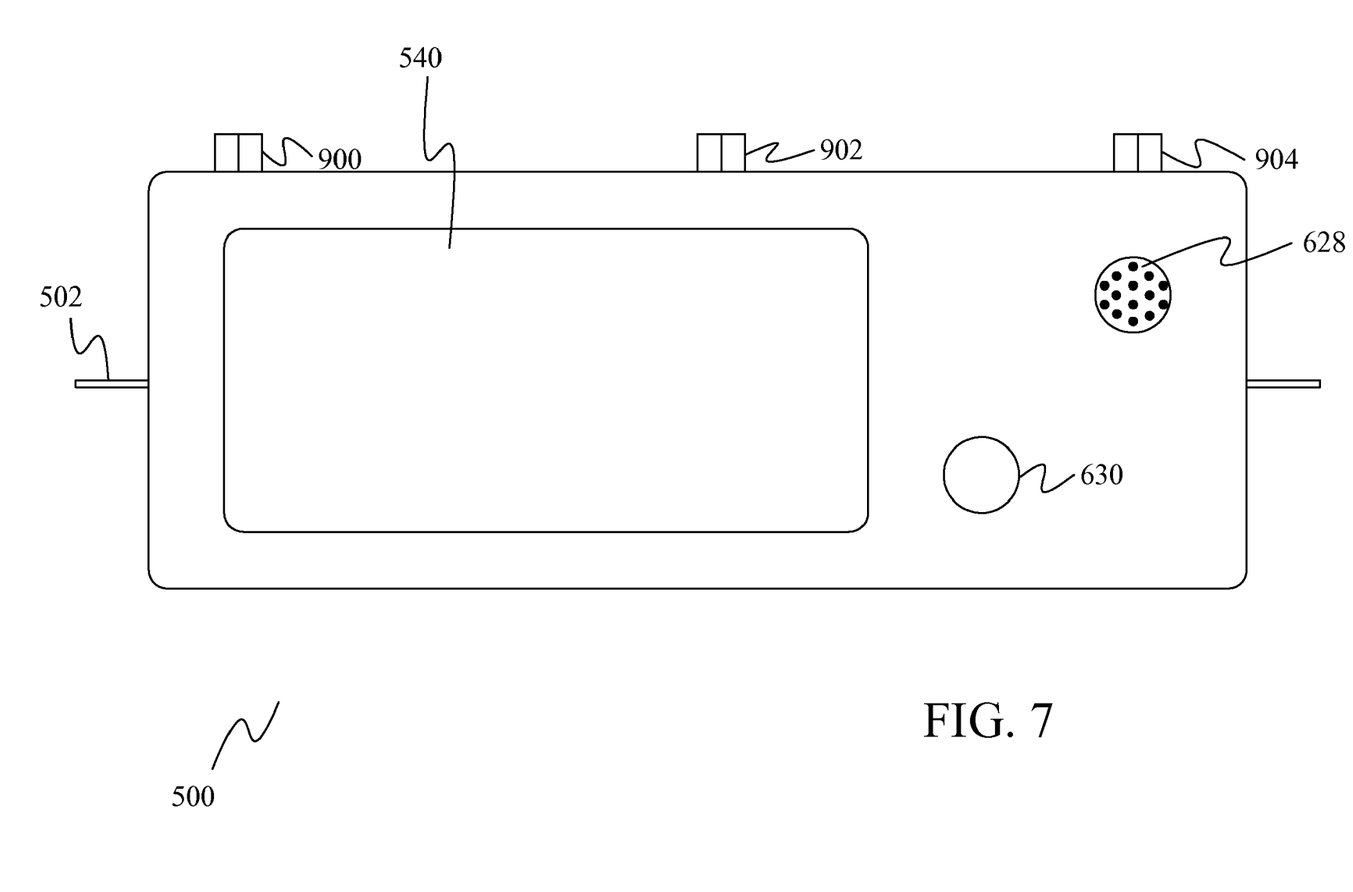
FIG. 7 is a top view of the optic fiber bending device of FIG. 5.

FIG. 7 shows a top view of fiber optic bending device 500 showing light emitting diode assembly 630, speaker 628, and flexible covering 540.

Figure 8:
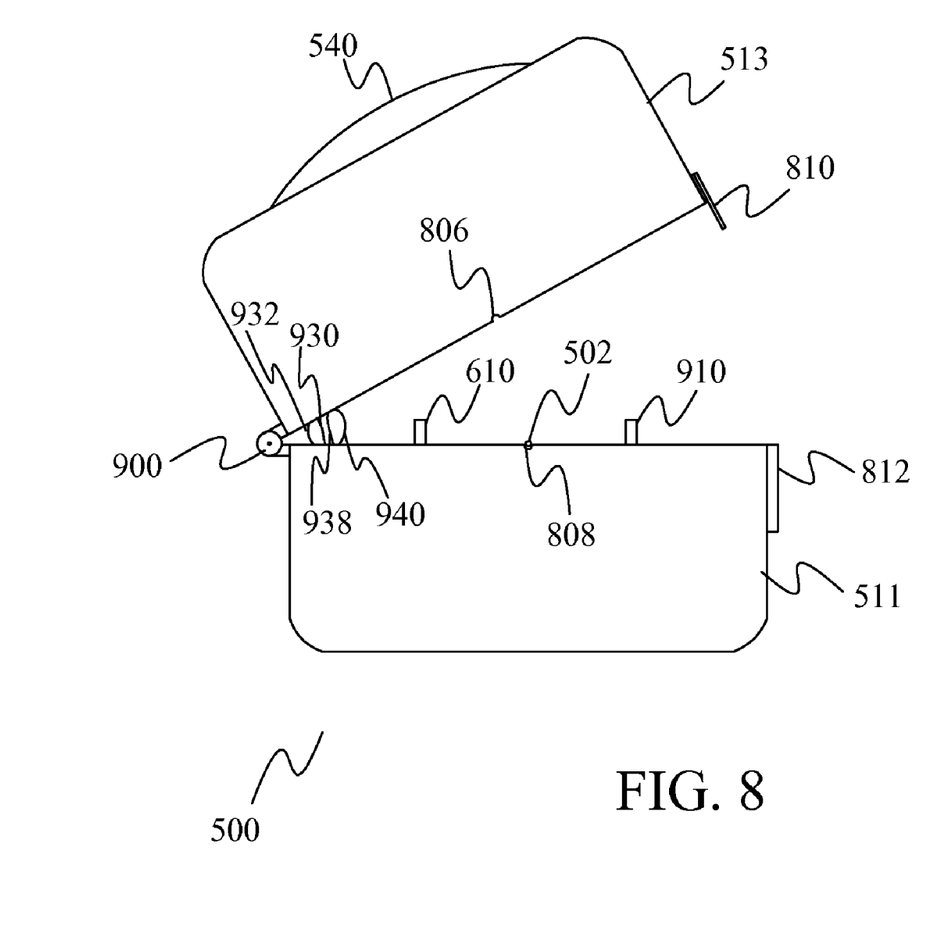
FIG. 8 is a back view of the optic fiber bending device of FIG. 5.
Figure 9:
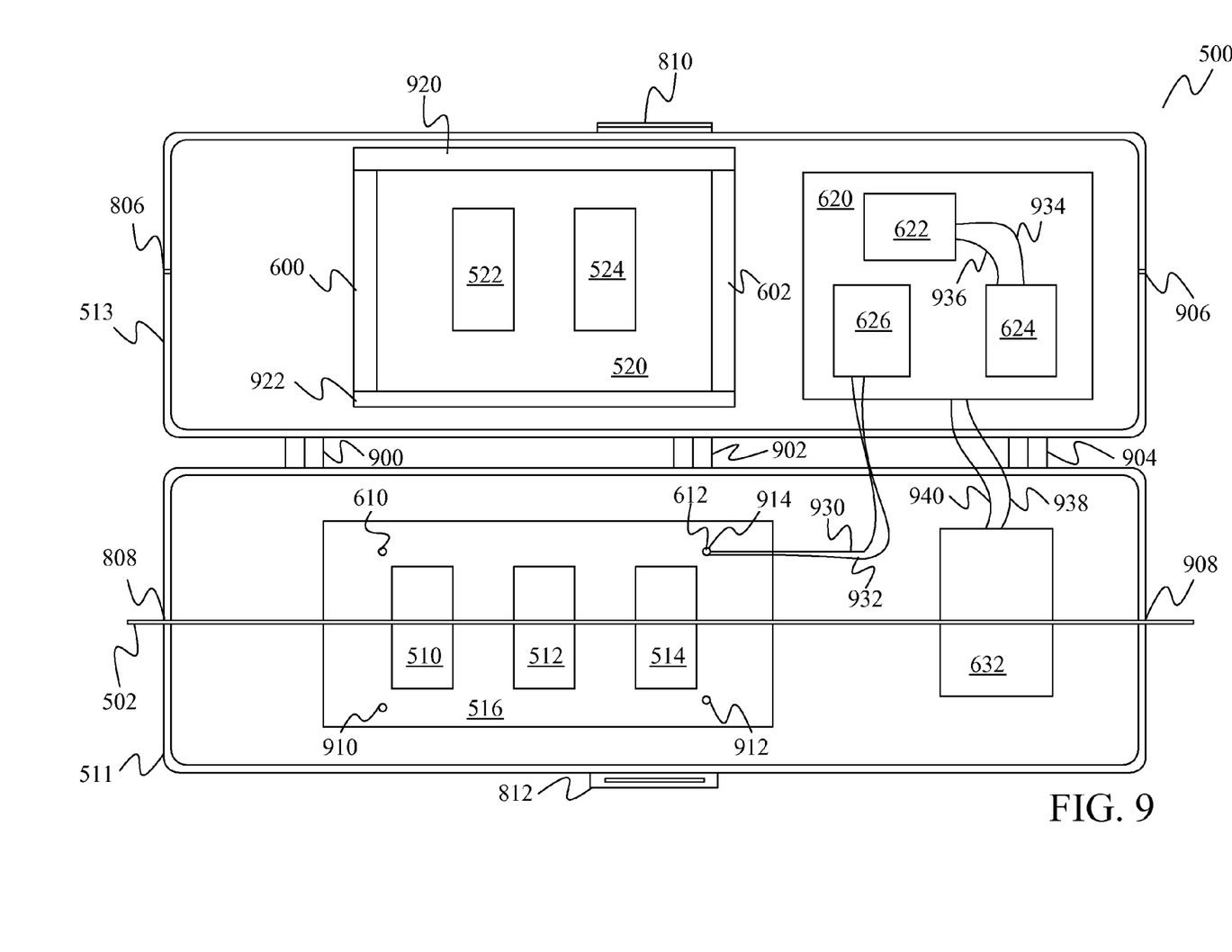
FIG. 9 is a top view of the optic fiber bending device of FIG. 5 with the case open.

FIG. 8 provides a back view of fiber optic bending device 500 showing optic fiber bending device 500 in a partially open state. FIG. 9 shows a top view of optic fiber bending device 500 in a fully open state.

In FIGS. 8 and 9, top case portion 513 is shown to be connected to bottom case portion 511 by three hinge assemblies 900, 902 and 904. Top case portion 513 may be pivoted about hinges 900, 902, and 904 relative to bottom case portion 511 to thereby open optic fiber bending device 500. Further, top case portion 513 includes latch element 810 and bottom case portion 511 includes latch element 812 that cooperate to latch top case portion 513 and bottom case portion 511 together in a closed state and that can be manipulated to unlatch and open case 504.

As shown in FIG. 9, lower case portion 511 contains fixed plate 516 with raised portions 510, 512, and 514 as well as restraining or stopping elements 610, 612, 910, and 912. A contact sensor 914 is positioned on top of restraining element 612. Lower case portion 511 also contains battery 632.

Top case portion 513 contains moveable plate 520 with raised portions 522 and 524 as well as guides 600, 602, 920, and 922, which guide the movement of moveable plate 520. Upper case portion 800 also contains printed circuit board 620, which is mounted to upper case portion 513 and contains light emitting diode controller 626, light sensor 622, and speaker controller 624.

Upper case portion 513 contains two channels 806 and 906 sized to accept a portion of optic fiber 502. Lower case portion 511 contains channels 808 and 908 (obscured by optic fiber 502 in FIG. 9) that also accept a portion of optic fiber 502.

To insert optic fiber 502 into optic fiber bending device 500, the latch mechanism consisting of elements 810 and 812 is manipulated to unlatch optic fiber bending device 500 and top case portion 513 is then rotated relative to bottom case portion 511. Optic fiber 502 is then placed in channels 808 and 908 before top case portion 513 is closed on bottom case portion 511 such that optic fiber 502 falls within channel portions 806 and 906 of top case portion 513 and such that latch element 810 engages with latch element 812. Once optic fiber bending device 500 is closed, the ends of optic fiber 502 extending out of optic fiber bending device 500 may be pulled apart to ensure that optic fiber 502 is straight within optic fiber bending device 500. In alternative embodiments, the optic fiber may be threaded through openings 505 and 507 of case 504 while case 504 is closed.

Contact sensor 914 is connected to light emitting diode controller 626 by conductors 930 and 932, which carry sensor signals from contact sensor 914 to light emitting diode controller 626. Light sensor 622 is connected to speaker controller 624 by conductors 934 and 936, which carry sensor signals from light sensor 622 to speaker controller 624. Power is provided by battery 632 to printed circuit board 620 by conductors 938 and 940.

Figure 10:
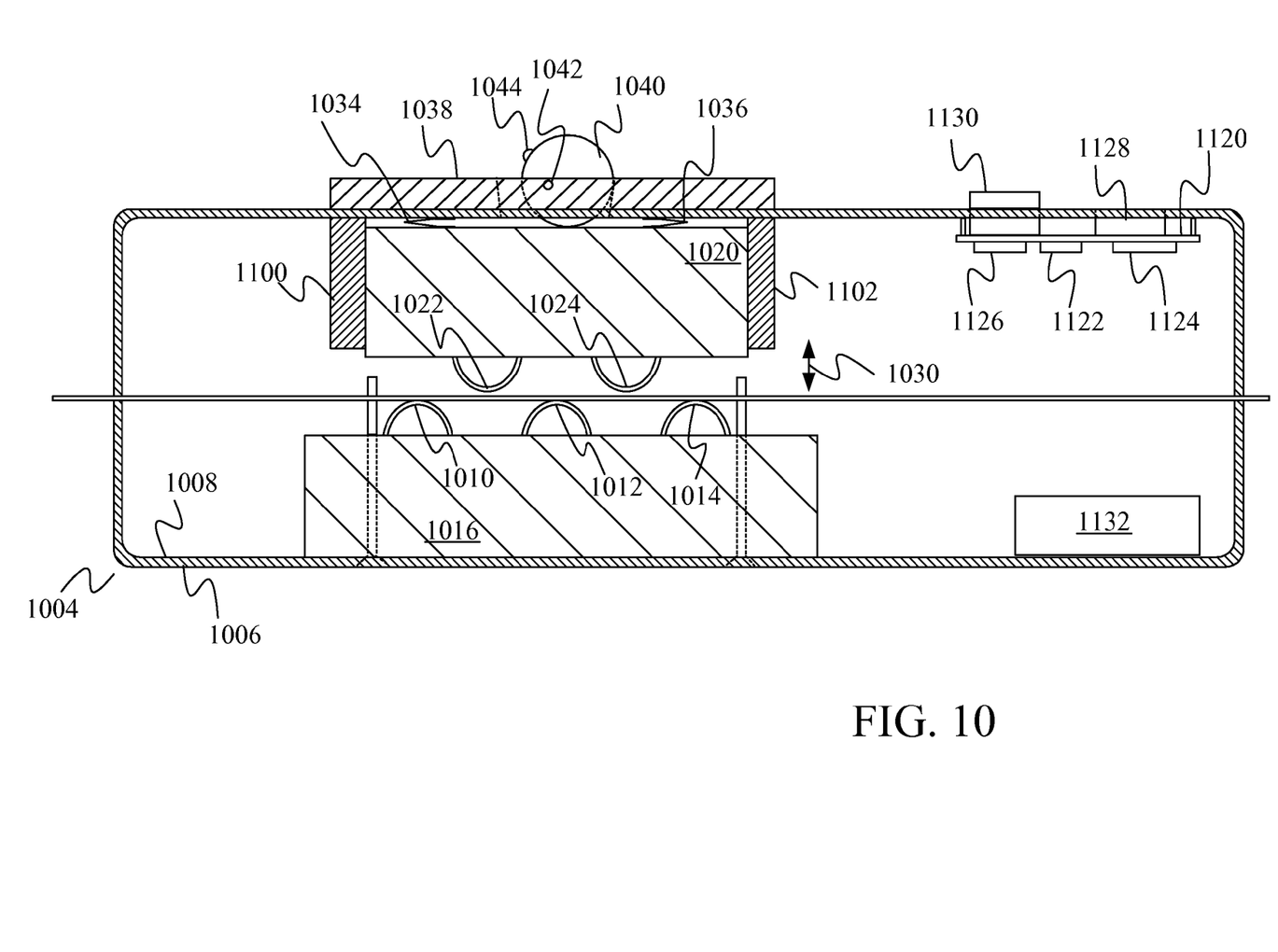
FIG. 10 is a cross-sectional side view of an optic fiber bending device under a second embodiment.

FIG. 10 provides a cross-sectional side view of an optic fiber bending device 1000 under a second embodiment of the present invention. In FIG. 10, an optic fiber 1002 is positioned on raised portions 1010, 1012, and 1014 of a fixed plate 1016. Raised portions 1010, 1012, 1014, and fixed plate 1016 have similar characteristics to raise portions 510, 512, 514, and fixed plate 516 of FIG. 5. Fixed plate 1016 is attached to the interior of case 1004, which under one embodiment has an interior metal layer 1008 and an exterior plastic shell 1006.

Optic fiber bending device 1000 has a moveable plate 1020 having raised portions 1022 and 1024 that are similar to moveable plate 520 and raised portions 522 and 524 of optic fiber bending device 500 of FIG. 5. Moveable plate 1020 may be moved in a vertical direction 1030 either toward or away from fixed plate 1016. The vertical movement of moveable plate 1020 is guided by guides 1100 and 1102.

Optic fiber bending device 1000 includes a printed circuit board 1120 having a light sensor 1122, a speaker controller 1124, and a light emitting diode controller 1126. Further, printed circuit board 1120 supports a light emitting diode assembly 1130 that extends out of case 1004 and a speaker 1128 that extends out of case 1004. A battery 1132 provides power to the electronics on printed circuit board 1120 through conductors (not shown).

Moveable plate 1020 is coupled to case 1004 by two spring plates 1034 and 1036. The spring plates pull moveable plate 1020 away from fixed plate 1016.

A wheel 1040 is mounted to a support structure 1038 by an axle 1042. Axle 1042 is positioned off-center on wheel 1040 such that when wheel 1040 is rotated it has an eccentric rotation about axle 1042. Wheel 1040 includes a nub 1044 to provide more friction between the user's finger or thumb to aid in the rotation of wheel 1040.

Figure 11:
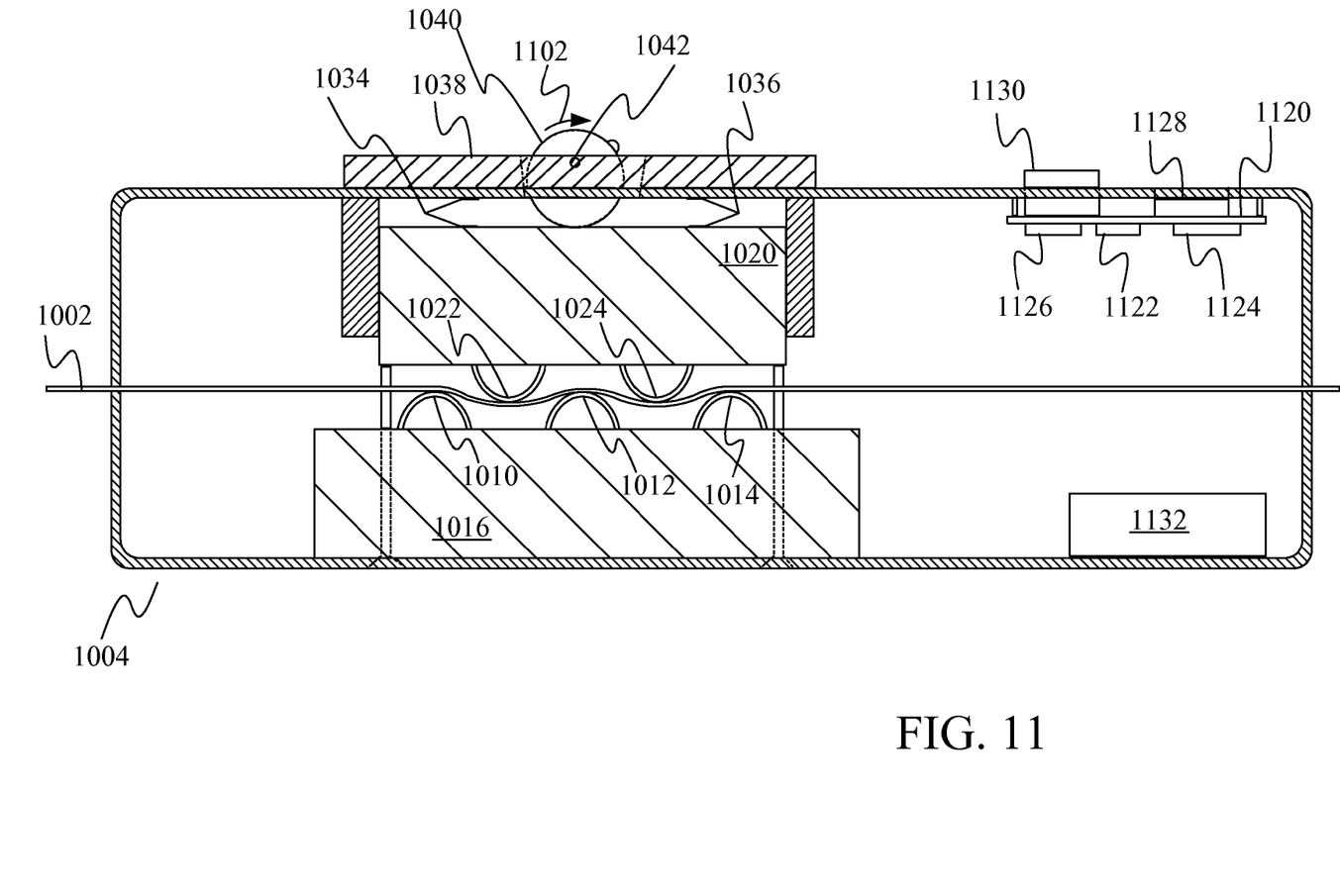
FIG. 11 is a cross-sectional side view of the optic fiber bending device of FIG. 10 showing an optic fiber being bent.

In FIG. 10, optic fiber bending device 1000 is in a non-bent state such that optic fiber 1002 is straight within optic fiber bending device 1000. As shown in FIG. 11, optic fiber bending device 1000 can be placed in a bent state in which optic fiber 1002 is bent several times by raised portions 1010, 1012, 1014, 1022, and 1024. Optic fiber bending device 1000 is placed in the bent state from the non-bent state by rotating wheel 1040 in a direction 1102. Because of the off-center mounting of wheel 1040, this rotation forces moveable plate 1020 toward fixed plate 1016 thereby causing raised portions 1022 and 1024 to engage optic fiber 1002 creating bends in optic fiber 1002. Note that if wheel 1040 is rotated in an opposite direction from direction 1102 after being in the bent state shown in FIG. 11, spring plates 1034 and 1036 will cause moveable plate 1020 to retract from fixed plate 1016 allowing optic fiber 1002 to be straight once again.

Optic fiber bending devices 500 and 1000 are designed to be manipulated by a user using just one hand. Thus, the user is able to change the state of optic fiber bending devices 500 and 1000 from a bent state to a non-bent state simply using one digit on their hand while holding the optic fiber bending device in that hand. Further, the width and height of optic fiber bending devices 500 and 1000 under one embodiment are sized such that the optic fiber bending device fits within a 1.5 inch diameter circle and such that an average human hand holding the optic fiber device is three-quarters closed while holding the optic fiber bending device.

Although two manually operated devices are described above, in other embodiments, the movable plate may be moved using an electromagnetic or piezoelectric motor.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   positioning a first end of an optic fiber a distance from a target;
   applying a laser light to a second end of the optic fiber such that the laser light is guided by the optic fiber from the second end to the first end of the optic fiber and is emitted from the first end of the optic fiber toward the target as a beam of light such that the beam of light has a first area of incidence at the target;
   bending the optic fiber such that the beam of light continues to reach the target and such that the area of incidence of the beam of light at the target changes without changing the distance between the first end of the optic fiber and the target, wherein bending the optical fiber comprises placing the optic fiber in a bending device and causing two plates in the fiber bending device to move relative to each other.

2. The method of claim 1 wherein bending the optic fiber further comprises holding the fiber bending device in one hand, and causing the two plates in the fiber bending device to move relative to each other by manipulating the fiber bending device using the hand that is holding the fiber bending device.

3. The method of claim 2 wherein manipulating the fiber bending device comprises squeezing the fiber bending device such that the two plates move toward each other.

4. The method of claim 3 wherein squeezing the fiber bending device comprises squeezing until the plates are stopped from moving by a restraining element in the fiber bending device.

5. The method of claim 4 wherein the restraining element comprises at least one stop screw.

6. The method of claim 4 wherein squeezing the fiber bending device further comprises squeezing the fiber bending device until a locking mechanism is engaged that maintains the plates at a set distance from each other while the optic fiber is bent.

7. The method of claim 2 wherein manipulating the fiber bending device comprises rotating a wheel to move one plate toward the other plate.

8. The method of claim 7 wherein the wheel is mounted on an axle that is positioned off-center on the wheel.

9. A method comprising:
   placing a portion of an optic fiber in an optic fiber bending device;

closing a case of the optic fiber bending device such that the case completely shields from view the portion of the optic fiber that is within the optic fiber bending device;

applying pressure to a first plate and a second plate in the fiber bending device to cause the first plate and the second plate to move toward each other and thereby bend the optic fiber.

10. The method of claim 9 further comprising positioning a first end of the optic fiber near a target and applying a laser light to a second end of the optic fiber such that light is emitted from the first end of the optic fiber and strikes the target.

11. The method of claim 10 wherein the light that strikes the target is distributed over an area on the target and wherein the area of the light on the target is larger when the portion of the optic fiber in the case is bent than when the portion of the optic fiber in the case is straight.

* * * * *